Jan. 2, 1934.                H. WITTEMEIER ET AL                1,941,524
                              AIR FILTER APPARATUS
                             Filed Sept. 9, 1931                2 Sheets-Sheet 1
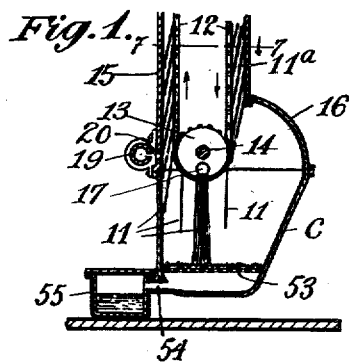
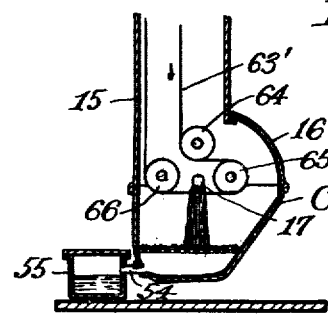
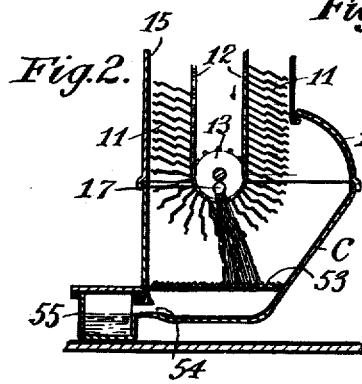
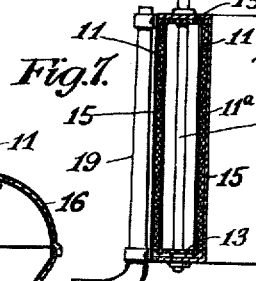
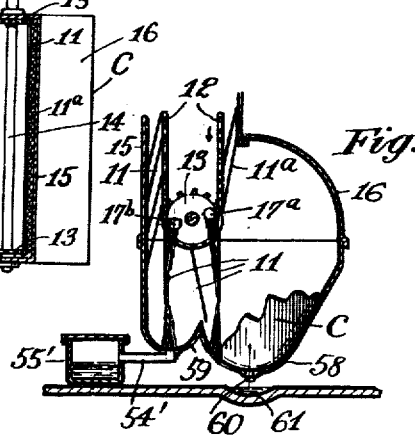
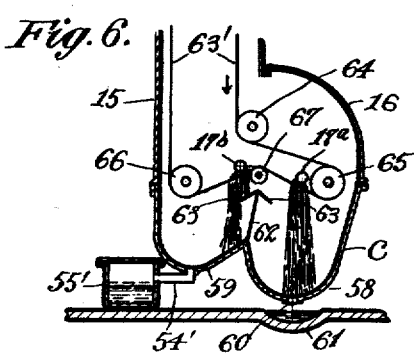
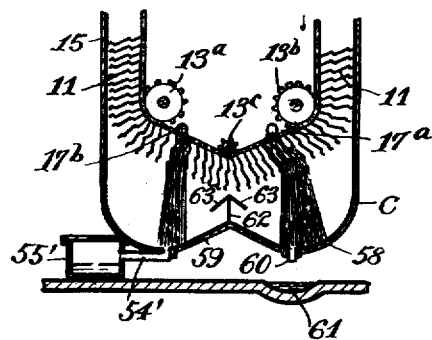
Inventors
Hans Wittemeier
Willy Neumann
By John 6. Seifert
Attorney

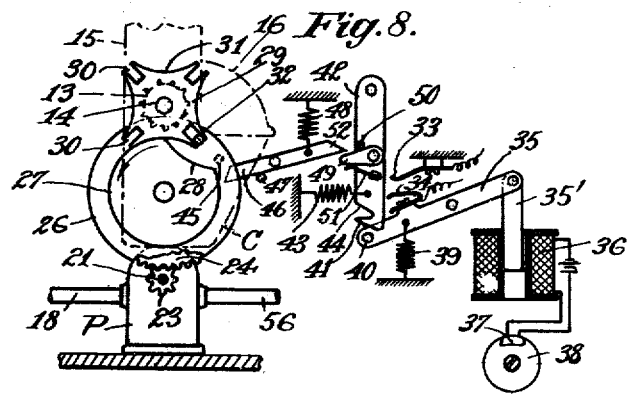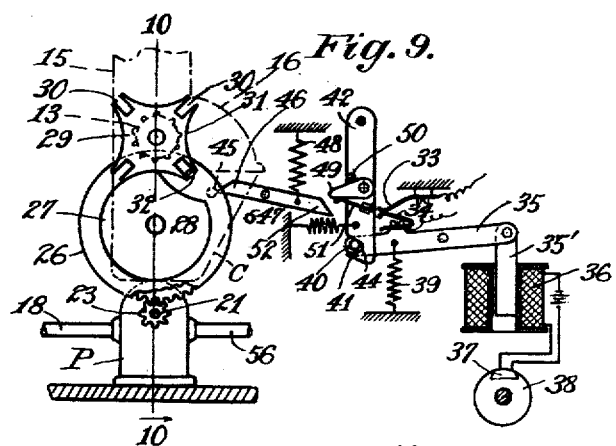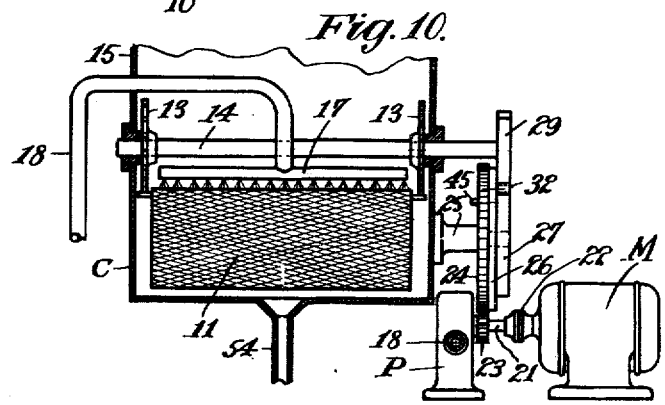

Patented Jan. 2, 1934

1,941,524

UNITED STATES PATENT OFFICE

1,941,524

AIR FILTER APPARATUS

Hans Wittemeier, Berlin-Grunewald, and Willy Neumann, Berlin - Charlottenburg, Germany; said Wittemeier assignor to Midwest Manufacturing Company, Inc., Louisville, Ky., a corporation of New York Application September 9, 1931, Serial No. 561,858, and in Germany September 10, 1930

14 Claims. (Cl. 183—9)

This invention relates to air filter apparatus of the type utilizing a viscous coated filter element in the form of an endless band or belt through which the air flows and upon the surface of which contained particles are impinged, the particles being held by the viscous coating of the element.

In service, filter elements of this character are arranged around upper and lower sprockets for movement from a cleaning zone which extends within a casing underneath the lower sprocket and in which the element is cleaned by and recoated with a viscous liquid, into a filtering zone which extends within a housing above the cleaning zone and in which the air filtering operation is effected. Heretofore, the cleaning operation has been accomplished by providing in the cleaning zone a body of viscous liquid which is positioned to immerse the lower end of the element, and permitting the particles to wash from the element as it travels through and emerges from the liquid. This alone has not been entirely satisfactory because it is necessary to permit the excess oil to drain from the newly cleaned portion of the element before it re-enters the filtering zone, and this necessitates a rate of travel so slow that the particles adhering to it are not thoroughly washed off during its immersion and subsequent drainage. Furthermore, since the element is not only cleaned but re-coated by the same body of oil, it is necessary to renew the oil frequently.

An object of the invention is to overcome the disadvantage by providing spray means for forcibly projecting the cleaning and recoating liquid against and flowing it over the surface of the filter element during its travel through the cleaning zone.

Another object of the invention is to arrange the spray means with respect to a filter element composed of an endless series of plates which are spaced and cooperatively positioned to define the air deflecting passages, so that the liquid is projected upon opposite faces of each plate thereby thoroughly subjecting the plates to the action of the liquid.

Another object is to provide separate spray means for the cleaning and re-coating operations and separate drainage means therefor.

Another object is to provide improved driving means which are manually or automatically rendered intermittently operative to actuate the filter element and spraying means simultaneously and to continue the spraying means in operation for a limited period of time after the filter element is brought to rest.

A further object is to provide means for projecting a flow of air against the filter element after it has been re-coated and before it re-enters the filtering zone, to the end of removing the surplus oil and thereby preventing or at least reducing the possibility of oil entrainment in the filtered air.

Other objects and advantages will hereinafter appear.

In the drawings accompanying and forming a part of this application Figures 1 to 4, inclusive, are sectional views illustrating different embodiments of the invention adapted for the cleansing and applying of a further supply of a moistening substance or fluid to the filter element comprising plates carried by an endless conveyer;

Figures 5 and 6 are similar views showing embodiments of the invention adapted for the cleansing and supplying of a moistening substance or fluid to a filter element comprising an endless band.

Figure 7 is a sectional view taken substantially on the line 7—7 of Figure 1 looking in the direction of the arrow.

Figures 8 and 9 are side elevations of the driving means and electrically operated means for controlling the operation of the driving means; and Figure 10 is a sectional view taken substantially on the line 10—10 of Figure 9 looking in the direction of the arrows.

In the embodiment of the invention shown in Figure 1, the filter element is composed of an endless series of plates 11, spaced and co-operatively arranged to define tortuous passages through which the air flows, and in which it is deflected so that contained particles are caused to impinge against the surfaces of the plates. The plates are pivotally connected to and carried by a conveyer for swinging movement about an axis extending along a longitudinal edge of each plate. The conveyer consists of a pair of spaced endless sprocket chains 12 passing around upper and lower sprocket wheels 13, only one of which is shown. The lower pair of sprocket wheels are fixed on a shaft 14 and located at elevated positions within and at opposite sides of a casing C, this casing carrying suitable bearings for rotatably supporting the shaft 14. The upper pair of sprockets (not shown) are similarly arranged and supported within a suitable housing which extends upwardly from the casing C, these parts being of any well known structure and arrangement such as a single or double pass structure, respectively shown in Patents No. 1,816,854, dated August 4, 1931, and No. 1,826,256, dated October 6, 1931. The filtering and cleaning zones are respectively contained within the housing and the casing C, the upper portion of the casing being provided at one side with an inspection door in the form of a removable plate 16.

As is usual in filtering apparatus of this character, the plates are coated with a viscous liquid, such as oil, which functions to retain the particles that are thrown or impinged against the plates when the air passes through the deflecting passages defined by the plates. In order to remove these particles, a nozzle or spray 17 in the form of a pipe is located below and in line with the lower sprocket shaft 14, and above the lower end of the filter element. This spray pipe is provided with perforations which are positioned to project a spray of oil axially downward across the path of travel of the filter element. The spray pipe 17 communicates with a supply pipe 18 (see Fig. 10) which extends through and is supported by a wall of the housing, the pipe 18 being connected through pump P to a suitable source of oil supply.

As the plates ascend and descend through the filtering zone, they travel relatively to guides 15 which are vertically positioned in the housing along the outer longitudinal edges of the plates and adjacent their ends. The guides on the descending side uniformly hold the descending plates in an upwardly inclined position as indicated at 11a in Figure 1. The descending plate guides extend downwardly to and terminate at the inspection door 16 at which point the casing C widens to permit each plate as it rides from the guides and enters the cleaning zone, to swing about its axis to a vertical position. The plates remain in such position as they approach and pass through the oil spray coming from the pipe 17. The latter is arranged to project oil against both faces of each plate, the flow of oil operating to wash adhering particles from the plates, and at the same time to provide the plates with a fresh or clean oil coating. As the axes of the plates successively approach the horizontal axial plane of the shaft 14, they gradually swing from a vertical position to a downwardly inclined position in which their outer edges are brought into engagement with the adjacent ascending plate guides 15, these guides serving to scrape some of the surplus liquid from the plates.

Should surplus oil continue to adhere to the plates as they ascend along the guides 15 toward the filtering zone, there is a possibility that particles of oil may be swept from the plates in the filtering zone and delivered with the filtered air. To obviate or reduce this possibility, means are provided to remove the surplus oil from the plates before they enter the filtering zone, this preferably being accomplished by directing a flow of air under pressure against the plates. For this purpose, a pipe 19 closed at one end, is placed over an opening 20 in a side wall of the housing, this opening being in a plane parallel with and located slightly above the axis of the shaft 14. The pipe is provided with outlet perforations which are aligned with the opening 20, so that when the pipe is connected with a source of compressed air supply (not shown), air under pressure will be directed against the plates as they pass the opening 20, and surplus oil thus blown or caused to flow from the plates.

The driving means which intermittently actuates both the filter element and the oil pump P, is arranged to continue the pump in operation for an interval of time after the filter element is brought to rest in order to assure thorough cleaning and recoating of the plates. In the embodiment shown in Figures 8, 9, and 10, the driving means includes an electric motor M, the shaft of which is connected to the shaft 21 of the oil pump P by a coupling 22. The motor M is also operatively connected to the lower shaft 14 of the filter element through a pinion 23, gear 24 and a translating mechanism which functions to effect the intermittent actuation of the shaft 14 from the continuous rotation of the motor during its intervals of operation. The pinion 23 is fixed to the pump shaft 21 and arranged to mesh with the gear 24 which is rotatably mounted on a stud 25. The translating mechanism includes a disk 26 which is mounted on the stud 25 and arranged to rotate with the gear 24. The disk 26 is provided with a circularly reduced portion or disk 27, the periphery of which is arcuately recessed as at 28. The disk 26 functions to rotate the shaft 14 intermittently through a plate 29 which is fixed to the shaft while the disk 27 functions to hold the plate 29 against movement during the intervals between its periods of operation. To this end, the plate 29 is made to extend outwardly from the shaft 14 along one face of the disk 26 to the periphery of the disk 27. The periphery of the plate 29 is provided with recesses 30 extending radially inward at 90 degree intervals while its peripheral portions between recesses are concavely curved as at 31 to conform to the curvature of the periphery of disk 27 against which it fits. The driving connections between disk 26 and plate 29 is effected through a pin 32 which is secured to the disk 26 in radial alignment with, and outwardly from the center of the arcuate recess 28 of the disk 27.

It will now be evident that when the disks 26 and 27 are rotated from the position shown in Figure 8 and in the direction indicated by the arrow, the pin 32 will pass into a recess 30 and move the plate 29 through an arc of 90 degrees thus actuating the filter element. During this movement, the recess 28 of the disk provides a clearance for the plate 29. At the end of such movement, the pin 32 is disengaged from the plate 29 while the periphery of the disk 27 is brought into engagement with a concave peripheral portion 31 of the plate for the dual purpose of preventing further movement of the plate as the disks complete the one revolution, and, of maintaining the next recess 30 of the plate in position to receive the pin 32 at the beginning of the next revolution of the disks.

From the foregoing, it will be apparent that the pump P will rotate continuously during each complete revolution of the gear 24 and disks 26 and 27, while the filter element will be moved continuously only during a short interval at the beginning of each complete revolution. Furthermore, the pump P will operate as long as the motor M is energized. Now in order to operate the pump intermittently, means are provided for opening and closing the motor circuit automatically at desired intervals. These means include a switch in the motor circuit which is opened to stop the motor at the end of each revolution of the gear 24 and which is closed to start it again after a suitable lapse of time.

The motor switch consists of a pair of contacts 33 and 34, contact 33 being mounted on a fixed part and contact 34 being carried by and insulated from a centrally pivoted lever 35. One arm of the lever 35 is pivotally connected to the plunger or armature 35' of a solenoid, the coil 36 of which is intermittently connected to a source of electricity by a suitable timing device. The timing device consists of a contact 37 carried by a continuously rotating disk 38 of insulating material, the disk rotating at a speed which is calculated to bring the contact 37 into circuit closing position when a suitable interval of time has elapsed after each complete revolution of the gear 24. The other arm of the lever 35 is urged by a spring 39 in a direction such as to pull the plunger 35', outwardly from the coil 36 as shown in Figure 8. The force exerted by the spring 39 is overcome by the pull of the coil 36 when the latter is energized, and the lever 35 thereby moved to close the motor switch contacts 33 and 34. During this movement, the pin 40 in one end of the lever 35, rides up the inclined or free end 41 of a vertically-arranged pivotally mounted arm 42 forcing that arm to move about its pivot against the action of a spring 43. The movement of the lever 35 continues until the pin 40 reaches a notch 44 in the arm 42 whereupon the spring 43 pulls the arm 42 back toward its original position thus causing the pin to be engaged in the notch as shown in Figure 9. In this manner, the lever 35 is locked in circuit closing position so that the circuit of the motor is maintained when the circuit of the coil 36 is broken by the timing device.

As soon as the motor circuit is closed the pump P and gear 24 begin to rotate, thus actuating the spray and filter element. In order to release the lever 35 when the gear 24 has made one complete revolution, the gear is provided with a laterally extended pin 45 positioned to engage one end of centrally pivoted lever 46 just before the gear completes its revolution. The lever 46 normally is held against a stop 47 by a spring 48, but during its engagement with the pin 45, the engaged end of the lever is moved away from the stop 47 against the tension of the spring 48. During this movement the opposite end of the lever 46 engages a latch 49 which is pivotally mounted on the arm 42 between an upper stop 50 and a lower spring 51. The lever 46 forces the latch 49 downwardly against the action of spring 51 until the lever clears the latch whereupon the latter is returned to the stop 50 by the spring 51. After this occurs, the lever 46 is disengaged from the gear pin 45 and returned to its original position by spring 48. As it returns, its inclined end face strikes the latch 49. Inasmuch as the stop 50 prevents the latch from moving upwardly with the lever, the force imparted to the latch causes the latch-supporting arm 42 to move about its pivot sufficiently to permit the lever 46 to pass. Such movement of the arm 42 is also sufficient to disengage the pin 40 and thus release the lever 35 whereupon the spring 39 is effective to pull the lever 35 downwardly and thus open the circuit of motor M, as shown in Figure 8. The motor is thus rendered inactive with the gear pin 32 positioned at the entrance to a recess 30 of plate 29 to effect a further actuation of the filter element upon a subsequent movement of the gear 24.

It will be noted that during the initial movement of the gear 24 through an arc of approximately 90 degrees the filter plate carrying conveyer will be actuated and thereby position a filter plate to extend transversely below the spraying nozzle 17 in which position it is maintained during the rotation of the gear through a complete revolution thereof, and during such time the pump will be operating and the filter plate will be subjected to the cleansing action of the coating fluid for the plates effecting a thorough cleansing and applying of a fresh and clean supply of the liquid to the surface of the plates.

In the arrangement of Figure 1 the perforations in the spraying nozzle are arranged to direct the liquid to opposite sides of the plate. The liquid with the accumulated foreign substances is received by the casing C which is provided with a strainer 53 spaced from the bottom and an outlet pipe 54 connecting the chamber under the strainer with a separating or settling tank 55. The inlet pipe 56 of the pump may be connected to the tank 55 or to another tank (not shown) into which the liquid from tank 55 is drained.

In the modified embodiment illustrated in Figure 2 the filter plates are of lateral offset or stepped form and they are fixedly connected with the conveyer chain. By this arrangement the plates may be arranged in closer relation increasing the surface area of the filter element or unit. To facilitate the cleansing and coating of the filter plates the sprayer tube or nozzle 17 is provided.

In the embodiment illustrated in Figure 3 the filter plates are pivotally carried by the conveyer chains the same as in Figure 1. However, in the Figure 3 arrangement two spraying nozzles 17a and 17b are utilized, the nozzle 17a being for the purpose of cleansing the viscous coating laden with foreign substance from the filter plate, using water for this purpose. The casing C is provided with a pair of wells 58, 59, the liquid delivered from the nozzle 17a and used for cleansing the filter plates is drained from the plates to the casing well 58 and is drained from said well through a drain outlet 60 to a trough or gutter 61 in the floor of the building in which the filter is located. The other spraying nozzle 17b is for the purpose of supplying a fresh coating of viscous liquid to the cleansed filter plates the surplus liquid draining from the filter plates to the casing well 59 from which it is drained by a pipe 54' to a tank 55' to which the pipe 56 (Figs. 8 and 9) connected with the pump inlet may be connected to serve as the liquid supply. In this arrangement the filter plate intermediate a plate being cleansed and a plate to which the viscous coating is being applied co-operates with an upwardly extending portion of the bottom of the casing to separate the two wells in the casing and serves in the nature of a splash plate and directing the liquid delivered from the nozzle 17a and drained from the plate cleansed thereby into the casing well 58.

In the embodiment of Figure 4 the conveyer chains pass over two pairs of sprocket wheels 13a and 13b and an intermediate pair of sprocket wheels 13c. The housing in this arrangement is of a width equal to the width of the casing C and the bottom of the casing is provided with the two wells 58, 59, by deflecting the bottom upward intermediate the sides of the casing and is provided with an upwardly extending separating wall 62 with drain boards 63 inclining from the top to opposite sides of the partition wall. The filter plates are fixed to the conveyer chains the same as shown in Figure 2, and the two spraying nozzles 17a, 17b are provided having spraying perforations similar to the nozzle in Figure 2. The one nozzle 17a is adapted to cleanse a viscous coating laden with foreign substances from the filter plates and the well 58 is provided with a drain outlet 60 to drain the liquid to a trough or gutter as in Figure 3. The liquid delivered by the nozzle 17b is for the purpose of applying a fresh supply of viscous liquid to the filter plates, the surplus liquid draining from the plates to the well 59 having the connection 54' with the tank 55' to serve as the source of supply for the pump P. The guiding wheels 13c are interposed between and arranged in a plane below the wheels 13a, 13b and above and in line with the separating wall 62 in the casing, the stretch of the conveyer travelling from the wheels 13b to the wheel 13c being in a declining plane, while the stretch of the conveyer from the wheels 13c to wheels 13a is in an inclining plane. The nozzles 17a, 17b are arranged in a plane below and adjacent to the wheels 13a and 13b and arranged to direct the streams from the nozzles into the respective casing walls 58, 59.

In the embodiments of Figures 5 and 6 the filter element is in the form of an endless band 63'. In Figure 5 the band is guided by passing the same under a drum or roller 64 and to rollers or drums 65, 66 spaced apart to provide a horizontal travelling stretch of the band. The guides 15 and casing C are arranged as in Figure 1, the casing having the strainer 53 with the connection 54 from below the strainer with the tank 55. The nozzle 17 is disposed between the drums 65, 66 to direct the stream of the liquid to cleanse and apply a fresh supply of viscous liquid coating over the band.

In the arrangement of Figure 6 the guide drums 64, 65, 66 are also provided, the bottom of the casing being provided with the two wells 58, 59 by deflecting the bottom upward intermediate the sides and the separating wall 62 extended upward therefrom and having the drain boards 63, the well 58 having the drain outlet to the gutter 61 and the well 59 having the connection 54' with the tank 55' as in Figure 4. The band guiding drum 65 is arranged above the well 58 and the guiding drum 66 above the well 59, an intermediate drum 67 over which the band passes from the drum 65 is arranged in a plane higher than the drums 65, 66 whereby the band travels in an upwardly inclined direction from drum 65 to drum 67 and from the latter in a declining direction to the drum 66, said drum being arranged above and in the plane of the separating wall 62. The two nozzles 17a, 17b are utilized, the liquid from nozzle 17a serving to cleanse the band while the liquid from nozzle 17b is for the purpose of applying a fresh moisture coating to the band. The liquid delivered by the nozzle 17a in Figures 3, 4 and 6 is for cleansing purposes only and the cleansing liquid may be water, while the liquid delivered by nozzle 17b in said figures is a viscous coating liquid, such as oil.

In the embodiment of Figures 1, 2 and 5 the operating mechanism utilizes a single pump as described, and in the arrangement of Figures 3, 4 and 6 when the liquid for cleansing the filter element or unit is the same as the liquid utilized for coating the filter element a single pump is utilized having branch pipes connected with the delivery thereof. In the use of a different fluid, such as water, for cleansing the filter element a separate and additional pump may be utilized which may be also operatively connected with the motor M, or the cleansing fluid or water may be a constant flow from a source of supply.

It will be obvious that various modifications may be made in the construction and arrangement of parts without departing from the scope of the invention, and that portions of the invention may be used without others and come within the scope of the invention.

Having thus described our invention, we claim:

1. In an air filter apparatus having filtering and cleaning zones, a filtering element comprising a traveling surface adapted to pass through said zones, said surface having a viscous coating for retaining foreign particles separated by the element during its travel through the filtering zone, and a pair of nozzles in the cleaning zone, one of said nozzles being adapted to clean the element by spraying a liquid over its surface, and the other nozzle being adapted to coat the element by spraying a viscous liquid over its surface.

2. A filtering apparatus as claimed in claim 1, wherein the cleaning zone is contained within a casing having a pair of wells respectively positioned below the filter element to receive the cleaning and the coating liquids draining therefrom.

3. In air filter apparatus, a casing having a cleaning zone, a housing extended from said casing, said housing having a filtering zone, a filter element adapted to move through said zones, said element having a viscous coating for retaining particles separated by it during its travel through the filtering zone, spray means extended in the casing transversely across the filter element and adapted to cleanse and re-coat it with a viscous liquid, and means to direct an air stream against the filter element to effect the draining of surplus liquid therefrom before it enters the filtering zone.

4. In fluid filtering apparatus, a filter element comprising a travelling surface coated with a viscous liquid and having rotatable supporting means and adapted for the accumulation of foreign substances thereon separated from fluid, a pump mechanism adapted for connection with a source of liquid supply, spraying means connected with the pump mechanism to spray the filter element to cleanse the viscous liquid with accumulated foreign substances from and apply a fresh coating of the viscous liquid to the filter element, power means, means to operatively connect the pump mechanism and filter with the power means to intermittently actuate the filter element and render the pump mechanism inactive after a predetermined actuation of the pump mechanism and during the period of rest of the filter element, and time controlled electrically operated means to render the pump mechanism active.

5. Fluid filtering apparatus as claimed in claim 14, wherein the means to operatively connect the pump mechanism and filter element with the power means and intermittently actuate the filter element comprises a coupling between the power means and a rotatable element of the pump mechanism, a plate rotatable with the supporting means for the filter element having inwardly radially extending recesses equidistantly spaced about the same, a pin carrying wheel connected with and rotatable from the connection of the pump mechanism with the power means and the pin adapted to engage a plate recess upon each revolution of the wheel to intermittently impart predetermined movements to the plate and filter element.

6. A fluid filtering apparatus as claimed in claim 14, wherein the power means comprises an electric motor, and the means to operatively connect the pump mechanism and filter element with the power means to intermittently actuate the filter element and render the pump mechanism inactive embodies a coupling between the motor and a rotatable element of the pump mechanism, a wheel rotatable from the connection of the motor with the pump mechanism having pins fixed in and extended laterally therefrom, a plate rotatable with the filter element supporting means having radially inwardly extending recesses equidistantly spaced about the same and with one of which recesses a wheel pin is adapted to co-operate upon each revolution of the wheel to impart a predetermined movement to the plate and filter element, circuit making and breaking means connected in the circuit of the motor, and means set in operation by the other pin extended from the wheel to move the circuit making and breaking means to circuit opening position upon each revolution of the pin carrying wheel.

7. In fluid filtering apparatus, a travelling surface coated with a viscous liquid adapted for the accumulation of foreign substances thereon separated from fluid passed thereover, rotatable supporting means therefor, a pump mechanism adapted for connection with a source of liquid supply, spraying means connected with the pump mechanism to spray the filter element to cleanse the viscous liquid with foreign substances accumulated thereon therefrom and supply a fresh coating of the viscous liquid to the filter element, an electric motor, means to operatively connect the motor with the pump mechanism and filter element to intermittently actuate the filter element, circuit making and breaking means connected in the motor circuit and normally urged to circuit opening position, means to releasably hold said circuit making and breaking means in opening and closing positions, time controlled electromagnetically operated means to actuate the circuit making and breaking means to circuit closing position and the holder means therefor retaining the circuit making and breaking means in said position, and means operative from the connection of the filter element with the motor at a predetermined period of time after the actuation of the filter element to release the holding means from and permit the circuit making and breaking means to move to circuit opening position 8. In fluid filtering apparatus, an intermittently operative travelling filter element, a washer for and relative to which successive portions of the filter element are positioned, means to actuate the washer in timed relation with the positioning of successive portions of the filter element relative to the washer, and means for disconnecting said filter element from said actuating means before the end of the period of operation of said washer.

9. In fluid filtering apparatus, a filter element comprising a travelling surface, rotatable supporting means therefor, spraying means to intersect the path of travel of and wash the filter element, and means to operate said supporting means intermittently to position successive sections of the filter element in spraying position and to operate said spraying means in predetermined timed relation with the positioning of the successive sections of the filter element.

10. In air filtering apparatus, a casing having a housing extended therefrom providing a filtering zone, a filter element having a liquid-coated surface and adapted to move through the filtering zone and the casing, said element operating to separate foreign substances from the air passing through the filtering zone, means for coating said filter element with liquid during its passage through the casing and means for directing air under pressure against the filter element to remove the surplus coating liquid remaining thereon after the coating operation.

11. In air filtering apparatus, a filter element comprising a traveling surface, a rotatable support therefor, and means for driving said support intermittently comprising driving means, a rotatable member driven thereby, means for effecting a driving connection between said rotatable member and said rotatable support for a limited portion of each revolution of said rotatable member, and means for holding said rotatable support against movement during intervals between its periods of actuation.

12. In air filtering apparatus, a filter element comprising a traveling surface, a rotatable support therefor, means for spraying said element with a liquid, a pump for supplying liquid to said spray, driving means for said pump, a rotatable member driven by said driving means, and means for effecting a driving connection between said rotatable member and said rotatable support for a limited portion of each revolution of said rotatable member.

13. An apparatus as claimed in 12 wherein means are provided for operating said driving means intermittently.

14. An apparatus as claimed in 12 wherein means controlled by the operation of said rotatable member are provided for stopping the driving means at the end of a pre-determined rotation of said rotatable member.

HANS WITTEMEIER.
WILLY NEUMANN.

CERTIFICATE OF CORRECTION.

Patent No. 1,941,524. January 2, 1934.

HANS WITTEMEIER, ET AL.

It is hereby certified that error appears in the printed specification of the above numbered patent requiring correction as follows: Page 4, lines 131 and 147, claims 5 and 6 respectively, for the claim number "14" read 4; and that the said Letters Patent should be read with these corrections therein that the same may conform to the record of the case in the Patent Office.

Signed and sealed this 30th day of January, A. D. 1934.

F. M. Hopkins (Seal) Acting Commissioner of Patents.

ter element and render the pump mechanism inactive embodies a coupling between the motor and a rotatable element of the pump mechanism, a wheel rotatable from the connection of the motor with the pump mechanism having pins fixed in and extended laterally therefrom, a plate rotatable with the filter element supporting means having radially inwardly extending recesses equidistantly spaced about the same and with one of which recesses a wheel pin is adapted to co-operate upon each revolution of the wheel to impart a predetermined movement to the plate and filter element, circuit making and breaking means connected in the circuit of the motor, and means set in operation by the other pin extended from the wheel to move the circuit making and breaking means to circuit opening position upon each revolution of the pin carrying wheel.

7. In fluid filtering apparatus, a travelling surface coated with a viscous liquid adapted for the accumulation of foreign substances thereon separated from fluid passed thereover, rotatable supporting means therefor, a pump mechanism adapted for connection with a source of liquid supply, spraying means connected with the pump mechanism to spray the filter element to cleanse the viscous liquid with foreign substances accumulated thereon therefrom and supply a fresh coating of the viscous liquid to the filter element, an electric motor, means to operatively connect the motor with the pump mechanism and filter element to intermittently actuate the filter element, circuit making and breaking means connected in the motor circuit and normally urged to circuit opening position, means to releasably hold said circuit making and breaking means in opening and closing positions, time controlled electromagnetically operated means to actuate the circuit making and breaking means to circuit closing position and the holder means therefor retaining the circuit making and breaking means in said position, and means operative from the connection of the filter element with the motor at a predetermined period of time after the actuation of the filter element to release the holding means from and permit the circuit making and breaking means to move to circuit opening position 8. In fluid filtering apparatus, an intermittently operative travelling filter element, a washer for and relative to which successive portions of the filter element are positioned, means to actuate the washer in timed relation with the positioning of successive portions of the filter element relative to the washer, and means for disconnecting said filter element from said actuating means before the end of the period of operation of said washer.

9. In fluid filtering apparatus, a filter element comprising a travelling surface, rotatable supporting means therefor, spraying means to intersect the path of travel of and wash the filter element, and means to operate said supporting means intermittently to position successive sections of the filter element in spraying position and to operate said spraying means in predetermined timed relation with the positioning of the successive sections of the filter element.

10. In air filtering apparatus, a casing having a housing extended therefrom providing a filtering zone, a filter element having a liquid-coated surface and adapted to move through the filtering zone and the casing, said element operating to separate foreign substances from the air passing through the filtering zone, means for coating said filter element with liquid during its passage through the casing and means for directing air under pressure against the filter element to remove the surplus coating liquid remaining thereon after the coating operation.

11. In air filtering apparatus, a filter element comprising a traveling surface, a rotatable support therefor, and means for driving said support intermittently comprising driving means, a rotatable member driven thereby, means for effecting a driving connection between said rotatable member and said rotatable support for a limited portion of each revolution of said rotatable member, and means for holding said rotatable support against movement during intervals between its periods of actuation.

12. In air filtering apparatus, a filter element comprising a traveling surface, a rotatable support therefor, means for spraying said element with a liquid, a pump for supplying liquid to said spray, driving means for said pump, a rotatable member driven by said driving means, and means for effecting a driving connection between said rotatable member and said rotatable support for a limited portion of each revolution of said rotatable member.

13. An apparatus as claimed in 12 wherein means are provided for operating said driving means intermittently.

14. An apparatus as claimed in 12 wherein means controlled by the operation of said rotatable member are provided for stopping the driving means at the end of a pre-determined rotation of said rotatable member.

HANS WITTEMEIER.
WILLY NEUMANN.

CERTIFICATE OF CORRECTION.

Patent No. 1,941,524. January 2, 1934.

HANS WITTEMEIER, ET AL.

It is hereby certified that error appears in the printed specification of the above numbered patent requiring correction as follows: Page 4, lines 131 and 147, claims 5 and 6 respectively, for the claim number "14" read 4; and that the said Letters Patent should be read with these corrections therein that the same may conform to the record of the case in the Patent Office.

Signed and sealed this 30th day of January, A. D. 1934.

F. M. Hopkins (Seal) Acting Commissioner of Patents.